United States Patent
Osumi et al.

(10) Patent No.: US 12,180,315 B2
(45) Date of Patent: Dec. 31, 2024

(54) ELASTOMER COMPOSITION AND SEALING MATERIAL

(71) Applicant: VALQUA, LTD., Tokyo (JP)

(72) Inventors: Naoki Osumi, Gojo (JP); Hirohisa Imada, Gojo (JP); Tomomitsu Mochizuki, Gojo (JP)

(73) Assignee: VALQUA, LTD., Tokyo (JP)

( * ) Notice: Subject to any disclaimer, the term of this patent is extended or adjusted under 35 U.S.C. 154(b) by 722 days.

(21) Appl. No.: 17/299,231

(22) PCT Filed: Dec. 2, 2019

(86) PCT No.: PCT/JP2019/047038
§ 371 (c)(1),
(2) Date: Jun. 2, 2021

(87) PCT Pub. No.: WO2020/116394
PCT Pub. Date: Jun. 11, 2020

(65) Prior Publication Data
US 2022/0041773 A1  Feb. 10, 2022

(30) Foreign Application Priority Data
Dec. 4, 2018 (JP) .................................. 2018-227528

(51) Int. Cl.
| C08F 216/14 | (2006.01) |
| C08F 214/26 | (2006.01) |
| C08K 5/14 | (2006.01) |
| C08L 27/18 | (2006.01) |
| C09K 3/10 | (2006.01) |
| F16J 15/10 | (2006.01) |
| C08K 5/3492 | (2006.01) |

(52) U.S. Cl.
CPC .... *C08F 216/1408* (2013.01); *C08F 214/262* (2013.01); *C08K 5/14* (2013.01); *C08L 27/18* (2013.01); *C09K 3/1009* (2013.01); *F16J 15/102* (2013.01); *C08K 5/34924* (2013.01); *C08L 2205/02* (2013.01); *C08L 2205/025* (2013.01)

(58) Field of Classification Search
None
See application file for complete search history.

(56) References Cited

U.S. PATENT DOCUMENTS

| 5,225,504 A | 7/1993 | Tatsu et al. |
| 6,281,296 B1 | 8/2001 | MacLachlan et al. |
| 2001/0008922 A1 | 7/2001 | Abe et al. |
| 2002/0198345 A1 | 12/2002 | Grootaert et al. |
| 2004/0171714 A1 | 9/2004 | Kuzawa et al. |
| 2008/0287627 A1* | 11/2008 | Noguchi ................. C08L 27/18 526/247 |
| 2010/0029831 A1 | 2/2010 | Meada et al. |
| 2012/0077935 A1* | 3/2012 | Gurevich ................ C08L 27/12 525/200 |
| 2013/0109797 A1 | 5/2013 | Fantoni et al. |
| 2016/0137828 A1* | 5/2016 | Gurevich ................. C08K 5/16 525/200 |
| 2016/0280824 A1* | 9/2016 | Hintzer ..................... C08F 2/26 |
| 2016/0319102 A1 | 11/2016 | Osumi et al. |
| 2019/0002682 A1 | 1/2019 | Tomizuka |
| 2019/0309199 A1 | 10/2019 | Osumi et al. |

FOREIGN PATENT DOCUMENTS

| CN | 105899600 A | 8/2016 |
| CN | 108884198 A | 11/2018 |
| EP | 0863941 A2 | 9/1998 |
| EP | 1400563 A1 | 3/2004 |
| JP | 8-151450 A | 6/1996 |
| JP | 2001-181350 A | 7/2001 |
| JP | 2004-263038 A | 9/2004 |
| JP | 2004-527596 A | 9/2004 |
| JP | 2010-37558 A | 2/2010 |
| JP | 2013-530298 A | 7/2013 |
| JP | 2015-124346 A | 7/2015 |
| JP | 2015174988 A * | 10/2015 |
| JP | 2017-160394 A | 9/2017 |
| JP | 2017-193682 A | 10/2017 |
| JP | 2017214556 A * | 12/2017 | .......... C08F 214/262 |
| TW | 201809113 A | 3/2018 |
| WO | 01/27194 A1 | 4/2001 |
| WO | 2008/041557 A1 | 4/2008 |
| WO | 2017/153203 A1 | 9/2017 |
| WO | 2018/038917 A1 | 3/2018 |

OTHER PUBLICATIONS

Machine translation of JP 2015074988 A, retrieved May 2024 (Year: 2024).*
Extended (Supplementary) European Search Report dated Aug. 25, 2022 issued in counterpart EP application No. 19893576.9. (6 pages).
International Search Report dated Feb. 10, 2020, issued in counterpart International Application No. PCT/JP2019/047038, with English Translation. (5 pages).
Office Action dated Sep. 5, 2022, issued in counterpart CN application No. 201980080113.8 with English translation. (13 pages).

\* cited by examiner

*Primary Examiner* — Nicole M. Buie-Hatcher
(74) *Attorney, Agent, or Firm* — WHDA, LLP

(57) ABSTRACT

Provided are an elastomer composition including a first fluoroelastomer that is a copolymer of tetrafluoroethylene and perfluoro (alkoxyvinyl ether) and a second fluoroelastomer different from the first fluoroelastomer, and a sealing material including a crosslinked product of the elastomer composition.

2 Claims, No Drawings

ELASTOMER COMPOSITION AND SEALING MATERIAL

TECHNICAL FIELD

The present invention relates to an elastomer composition and a sealing material using the elastomer composition.

BACKGROUND ART

Sealing materials (gaskets, packings, and the like) are used for various applications, and characteristics according to the applications are required. For example, when sealing materials are used under a high-temperature environment, they are required for heat resistance. When sealing materials are used under an environment in which the sealing materials are exposed to a plasma, they are required for resistance to the plasma (plasma resistance).

Meanwhile, ozone having strong oxidizing power may be used in a film forming process in producing a semiconductor device or a flat panel display. Sealing materials used in a production device using ozone are required for resistance to ozone (ozone resistance).

Japanese Patent Laying-Open No. H08-151450 (PTL 1), Japanese Patent Laying-Open No. 2004-263038 (PTL 2), and Japanese Patent Laying-Open No. 2010-037558 (PTL 3) describe sealing materials focusing on the ozone resistance.

CITATION LIST

Patent Literatures

PTL 1: Japanese Patent Laying-Open No. F108-151450
PTL 2: Japanese Patent Laying-Open No. 2004-263038
PTL 3: Japanese Patent Laying-Open No. 2010-037558

SUMMARY OF INVENTION

Technical Problem

However, in fluoro-rubber molded articles described in PTLs 1 and 2, the ozone resistance under a high-temperature environment is insufficient, and it is generally difficult to obtain a crosslinking agent described in PTL 3.

An object of the present invention is to provide an elastomer composition capable of being prepared by using commonly available raw materials and capable of forming a crosslinked product exhibiting good ozone resistance under a high-temperature environment, and a sealing material using the elastomer composition.

Solution to Problem

The present invention provides an elastomer composition and a sealing material shown below.

[1] An elastomer composition comprising a first fluoroelastomer that is a copolymer containing a constituent unit derived from tetrafluoroethylene and one or more constituent units derived from perfluoro (alkoxyvinyl ether); and a second fluoroelastomer different from the first fluoroelastomer, or comprising two or more of the first fluoroelastomers.

[2] The elastomer composition according to [1], wherein the second fluoroelastomer is a perfluoroelastomer.

[3] The elastomer composition according to [2], wherein the second fluoroelastomer is a copolymer containing the constituent unit derived from tetrafluoroethylene and one or more constituent units derived from perfluoro (alkyl vinyl ether).

[4] The elastomer composition according to any one of [1] to [3], wherein the first fluoroelastomer and the second fluoroelastomer are contained in a mass ratio of 10:90 to 90:10.

[5] The elastomer composition according to any one of [1] to [4], further comprising a peroxide crosslinking agent and a co-crosslinking agent.

[6] A sealing material comprising a crosslinked product of the elastomer composition according to any one of [1] to [5].

Advantageous Effects of Invention

The present invention can provide an elastomer composition capable of forming a crosslinked product exhibiting good ozone resistance under a high-temperature environment, and a sealing material using the elastomer composition.

DESCRIPTION OF EMBODIMENTS

<Elastomer Composition>

The elastomer composition according to the present invention includes a first fluoroelastomer that is a copolymer containing a constituent unit derived from tetrafluoroethylene and one or more constituent units derived from perfluoro (alkoxyvinyl ether), and a second fluoroelastomer different from the first fluoroelastomer. A crosslinked product of the elastomer composition including the first fluoroelastomer and the second fluoroelastomer is excellent in ozone resistance under a high-temperature environment. Excellent ozone resistance under a high-temperature environment specifically means that a change in physical properties is small before and after the crosslinked product of the elastomer composition is exposed to high-temperature ozone. For the change in physical properties, a rate of change in tensile product (tensile product ratio) can be used as an indicator. The tensile product can be determined as {tensile strength (MPa)×elongation at break (%)}. The tensile strength and the elongation at break are each measured according to the method described in the sections of Examples described later.

[a] First fluoroelastomer

The first fluoroelastomer is a copolymer containing the constituent unit derived from tetrafluoroethylene (hereinafter, may be referred to as "TFE") and one or more constituent units derived from perfluoro (alkoxyvinyl ether). The first fluoroelastomer may further contain a constituent unit derived from another fluoromonomer. An elastomer composition containing the first fluoroelastomer can further enhance the ozone resistance under a high-temperature environment as compared with a composition containing a hydrogen atom-containing fluoroelastomer. The first fluoroelastomer is also excellent in heat resistance and chemical resistance.

A perfluoro (alkoxyvinyl ether) forming the first fluoroelastomer can have a group that is bonded to a vinyl ether group ($CF_2=CFO-$) and that has 3 to 12 carbon atoms, and examples thereof include $CF_2=CFOCF_2CF(CF_3)OC_nF_{2n+1}$, $CF_2=CFO(CF_2)_3OC_nF_{2n+1}$, $CF_2=CFOCF_2CF(CF_3)O(CF_{20})_mC_nF_{2n+1}$, or $CF_2=CFO(CF_2)_2OC_nF_{2n+1}$. In the formula, n is for example 1 to 5, and m is for example 1 to 3.

The first fluoroelastomer usually has a crosslinking property. The crosslinking property can be imparted by further copolymerizing a crosslinking site monomer (further containing a constituent unit derived from a crosslinking site monomer). The crosslinking site means a site capable of being crosslinked. Examples of the crosslinking site include halogen groups (for example, an I group, a Br group, and the like) and a nitrile group (CN group), and the crosslinking site is preferably a halogen group and more preferably an I group. The fluoroelastomer having a halogen group as the crosslinking site can be crosslinked by a peroxide crosslinking system using a peroxide crosslinking agent, whereby a crosslinked product having better ozone resistance under a high-temperature environment can be obtained.

An example of the crosslinking site monomer having a halogen group as the crosslinking site is a halogen group-containing perfluorovinyl ether. Examples of the halogen group-containing perfluorovinyl ether include $CF_2=CFO(CF_2)_nOCF(CF_3)X$ (n is for example 2 to 4), $CF_2=CFO(CF_2)_nX$ (n is for example 2 to 12), $CF_2=CFO[CF_2CF(CF_3)O]_m(CF_2)_nX$ (X is a halogen group, n is for example 2, and m is for example 1 to 5), $CF_2=CFO[CF_2CF(CF_3)O]_m(CF_2)_nX$ (X is a halogen group, n is for example 1 to 4, m is for example 1 to 2), and $CF_2=CFO[CF_2CF(CF_3)O]_nCF_2CF(CF_3)X$ (X is for example a halogen group, n is for example 0 to 4).

A crosslinkable perfluoroelastomer may have a crosslinking structure crosslinking two main chains.

In the first fluoroelastomer, a molar ratio of the constituent unit derived from TFE/the constituent unit derived from the perfluoro (alkoxyvinyl ether)/the constituent unit derived from the crosslinking site monomer is usually 50 to 74.8%/25 to 49.8%/0.2 to 5%, and preferably 60 to 74.8%/25 to 39.5%/0.5 to 2%.

The first fluoroelastomer can include two or more first fluoroelastomers of different types. In the present specification, the fact that the first fluoroelastomers are different in type from each other means that at least one of the type and variety of perfluoro (alkoxyvinyl ether), a ratio of the constituent unit derived from TFE/the constituent unit derived from perfluoro (alkoxyvinyl ether), and a molecular weight of the first fluoroelastomer is different.

Examples of a commercially available product of the first fluoroelastomer include "TECNOFLON PFR LT" manufactured by Solvay.

[b] Second Fluoroelastomer

The second fluoroelastomer is a fluoroelastomer different from the first fluoroelastomer. "Being different from the first fluoroelastomer" means being different from the first fluoroelastomer in the type of constituent unit. The second fluoroelastomer preferably does not contain the constituent unit derived from perfluoro (alkoxyvinyl ether). Examples of the second fluoroelastomer include vinylidene fluoride-based fluororubber (hereinafter, may be referred to as "FKM") containing vinylidene fluoride as a main component, tetrafluoroethylene-propylene rubber (hereinafter, may be referred to as "FEPM"), perfluoroelastomers (hereinafter, may be referred to as "FFKM") other than the first fluoroelastomer, fluorine-based thermoplastic elastomers, fluorine-based liquid rubber, and fluorosilicone rubber.

The second fluoroelastomer is preferably a perfluoroelastomer, and more preferably a copolymer containing a constituent unit derived from TFE and one or more constituent units derived from perfluoro (alkyl vinyl ether). The second fluoroelastomer may further contain the constituent unit derived from another fluoromonomer. The elastomer composition in which the second fluoroelastomer is a copolymer containing the constituent unit derived from TFE and the constituent unit derived from perfluoro (alkyl vinyl ether) can further enhance the ozone resistance under a high-temperature environment. The copolymer containing the constituent unit derived from TFE and the constituent unit derived from perfluoro (alkyl vinyl ether) is also excellent in heat resistance and chemical resistance.

A perfluoro (alkyl vinyl ether) forming the second fluoroelastomer can have an alkyl group having 1 to 5 carbon atoms, and examples thereof include perfluoro (methyl vinyl ether), perfluoro (ethyl vinyl ether), and perfluoro (propyl vinyl ether). Perfluoro (alkyl vinyl ether) is preferably perfluoro (methyl vinyl ether).

The second fluoroelastomer usually has a crosslinking property. As the crosslinking site and the crosslinking site monomer, those similar to the first fluoroelastomer described above can be used.

In the second fluoroelastomer, a molar ratio of the constituent unit derived from TFE/the constituent unit derived from the perfluoro (alkyl vinyl ether)/the constituent unit derived from the crosslinking site monomer is usually 50 to 74.8%/25 to 49.8%/0.2 to 5%, and preferably 60 to 74.8%/25 to 39.5%/0.5 to 2%.

The second fluoroelastomer can include two or more second fluoroelastomers of different types. The fact that the second fluoroelastomers are different in type from each other means that at least one of the type and variety of the constituent unit of the second fluoroelastomer, a ratio of two or more constituent units constituting the second fluoroelastomer, and a molecular weight of the second fluoroelastomer is different.

Examples of commercially available products of the second fluoroelastomer include "TECNOFLON PFR-94" manufactured by Solvay, "Dyneon PFE 90Z" and "Dyneon PFE 131TZ" manufactured by 3M, and "TECNOFLON P 459" manufactured by Solvay.

The elastomer composition may contain the first fluoroelastomer and the second fluoroelastomer in a mass ratio of 10:90 to 90:10, in a mass ratio of 20:80 to 80:20, or in a mass ratio of 30:70 to 70:30. The first fluoroelastomer and the second fluoroelastomer may be contained in an equal mass ratio.

[c] Other Elastomers

The elastomer composition may contain an elastomer other than the first fluoroelastomer and the second fluoroelastomer. Examples of other elastomers include ethylene-propylene-diene rubber (EPDM), ethylene-propylene rubber (EPM), nitrile rubber (NBR; acrylonitrile butadiene rubber), hydrogenated nitrile rubber (HNBR; hydrogenated acrylonitrile butadiene rubber), butyl rubber (IIR), and silicone rubber (Q). Only one of the other elastomers may be contained, or two or more of the other elastomers may be contained.

[d] Crosslinking Agent and Co-Crosslinking Agent

The crosslinking system of the elastomer composition is not particularly limited, and examples thereof include peroxide crosslinking systems, polyamine crosslinking systems, and polyol crosslinking systems in the case of FKM and FEPM, and peroxide crosslinking systems, bisphenol crosslinking systems, triazine crosslinking systems, oxazole crosslinking systems, imidazole crosslinking systems, and thiazole crosslinking systems in the case of FFKM. The elastomer composition may be crosslinked with any one crosslinking system or may be crosslinked with two or more crosslinking systems. The elastomer composition preferably contains a peroxide crosslinking agent.

The peroxide crosslinking agent may be, for example, 2,5-dimethyl-2,5-di(t-butylperoxy)hexane (commercially available example: "PERHEXA 25B", "PERHEXA 25B-40" manufactured by NOF CORPORATION); dicumyl peroxide (commercially available example: "PERCUMYL D" manufactured by NOF CORPORATION); 2,4-dichlorobenzoyl peroxide; di-t-butyl peroxide; t-butyl dicumyl peroxide; benzoyl peroxide (commercially available example: "NYPER B" manufactured by NOF CORPORATION); 2,5-dimethyl-2,5-(t-butylperoxy)hexyne-3 (commercially available example: "PERHEXYNE 25B" manufactured by NOF CORPORATION); 2,5-dimethyl-2,5-di(benzoylperoxy)hexane; $\alpha,\alpha'$-bis(t-butylperoxy-m-isopropyl)benzene (commercially available example: "PERBUTYL P" manufactured by NOF CORPORATION); t-butyl peroxyisopropyl carbonate; parachlorobenzoyl peroxide, or the like. Only one of peroxide crosslinking agent may be used, or two or more of the peroxide crosslinking agents may be used in combination.

Examples of the co-crosslinking agent used in the peroxide crosslinking system include compounds capable of being co-crosslinked by radicals (unsaturated polyfunctional compounds) such as triallyl isocyanurate (commercially available example: "TAIC" manufactured by Nihon Kasei Co., Ltd.); triallyl cyanurate; triallyl formal; triallyl trimellitate; N,N'-m-phenylene bismaleimide; dipropargyl terephthalate; diallyl phthalate; and tetraallyl terephthalamide. Only one co-crosslinking agent may be used, or two or more of the co-crosslinking agents may be used in combination. Among the above co-crosslinking agents, the co-crosslinking agent preferably contains triallyl isocyanurate from the viewpoint of reactivity and compression set characteristics.

The content of the peroxide crosslinking agent (the total amount when two or more thereof are used) in the elastomer composition is, for example, 0.01 to 20 parts by mass based on 100 parts by mass of the total amount of the elastomer, and from the viewpoint of improving the ozone resistance, the content is preferably 0.1 to 10 parts by mass, and more preferably 0.5 to 5 parts by mass.

The content of the co-crosslinking agent (the total amount when two or more thereof are used) in the elastomer composition is, for example, 0.1 to 40 parts by mass based on 100 parts by mass of the total amount of the elastomer, and from the viewpoint of improving the ozone resistance, the content is preferably 0.2 to 10 parts by mass.

[e] Other Blending Agents

For the purpose of improving processability and controlling physical properties, the elastomer composition can contain additives such as an anti-aging agent, an antioxidant agent, a vulcanization accelerator, a processing aid (stearic acid or the like), a stabilizer, a tackifier, a silane coupling agent, a plasticizer, a flame retardant agent, a mold release agent, a wax, and a lubricant, if necessary. Another example of the additives is a tackiness reducing (preventing) agent such as a fluorine-based oil (for example, perfluoropolyether or the like). Only one additive may be used, or two or more of the additives may be used in combination.

Volatilization, elution, or deposition may occur when the sealing material is used under a high-temperature environment, and therefore, the amount of the additive is preferably as small as possible (for example, less than or equal to 10 parts by mass, preferably less than or equal to 5 parts by mass, more preferably less than or equal to 2 parts by mass, and still more preferably less than or equal to 1 part by mass, based on 100 parts by mass of the total amount of the elastomer), and it is desirable that no additive be contained.

The elastomer composition may contain fillers such as carbon black, silica, alumina, zinc oxide, titanium oxide, clay, talc, diatomaceous earth, barium sulfate, calcium carbonate, magnesium carbonate, calcium oxide, mica, graphite, aluminum hydroxide, aluminum silicate, hydrotalcite, a metal powder, a glass powder, and a ceramic powder, if necessary. Among them, carbon black or silica is preferably contained. Only one filler may be used, or two or more of the fillers may be used in combination. The content of the filler (the total amount when two or more thereof are used) in the elastomer composition is, for example, 0.1 to 40 parts by mass based on 100 parts by mass of the total amount of the elastomer, and from the viewpoint of improving the ozone resistance, the content is preferably 1 to 30 parts by mass.

The elastomer composition may contain an organic pigment. Examples of the organic pigment usable in the present invention include azo pigments (such as azo lake pigments, insoluble azo pigments, and condensed azo pigments); polycyclic pigments such as anthraquinone-based pigments, thioindigo-based pigments, perinone-based pigments, perylene-based pigments, quinacridone-based pigments, isoindolinone pigments, isoindoline pigments, dioxazine pigments, quinophthalone pigments, and diketopyrrolopyrrole pigments, and phthalocyanine-based pigments. The elastomer composition may contain only one organic pigment, or may contain two or more of the organic pigments. As the organic pigment, an organic pigment classified as a pigment in color index can be used.

Preferably, the organic pigment contains no metal element. If the organic pigment containing no metal element is used, there is no possibility that a substance derived from a metal element is scattered even if the sealing material is used under a severe ozone environment such as a semiconductor application, and the sealing material is etched.

From the viewpoint of effectively improving the ozone resistance under a high-temperature environment and/or the compression set characteristics under a high-temperature environment, the content of the organic pigment (the total amount when two or more thereof are used) in the elastomer composition is preferably 0.05 to 10 parts by mass, more preferably 0.07 to 5 parts by mass, and still more preferably 0.1 to 2 parts by mass, per 100 parts by mass of the elastomer, and the content is, for example, 0.1 to 1.1 parts by mass.

[f] Preparation of Elastomer Composition

The elastomer composition can be prepared by uniformly kneading an elastomer, a crosslinking agent, a co-crosslinking agent, and a filler and other blending agents added as necessary. For example, conventionally known kneading machines such as a mixing roller, a pressurized kneader, and an internal mixer (Banbury mixer) can be used. At this time, among the blending components, components other than a component (crosslinking accelerator, crosslinking retarder, crosslinking agent, and the like) contributing to crosslinking reaction may be first uniformly kneaded, and then the component contributing to the crosslinking reaction may be kneaded. A kneading temperature is preferably, for example, around room temperature.

A modification of the elastomer composition according to the present invention is an elastomer composition containing two or more first fluoroelastomers. As the first fluoroelastomer, the first fluoroelastomer described above can be used. A crosslinked product of the elastomer composition including two or more first fluoroelastomers is excellent in the ozone resistance under a high-temperature environment. The two or more first fluoroelastomers are different from each other, for example, in the type of perfluoro (alkoxyvinyl ether) constituting the first fluoroelastomer. Being different from each other in the type of perfluoro (alkoxyvinyl ether) means, for example, being different from each other in the number of carbon atoms of the alkoxy group of perfluoro (alkoxyvinyl ether). The elastomer composition may further contain the second fluoroelastomer described above, other elastomers, a crosslinking agent, a co-crosslinking agent, and other blending agents.

<Sealing Material>

A crosslinked molded product such as a sealing material can be produced by the crosslinking and molding (vulcanization molding) of the elastomer composition. That is, the sealing material is composed of a crosslinked product of the elastomer composition. The crosslinking and molding can be carried out by pre-molding the elastomer composition if necessary and then press-molding the pre-molded product using a mold. A molding temperature is, for example, about 150 to 220° C., and a heating time (crosslinking time) is, for example, about 0.5 to 120 minutes. The molding may be carried out by feed press molding, injection molding, extrusion molding or the like. If necessary, secondary crosslinking may be carried out at a temperature of about 150 to 320° C. A secondary crosslinking time is, for example, about 0.5 to 24 hours.

After the step of carrying out crosslinking and molding (press molding) as described above, there may be provided a step of irradiating the molded product with an ionizing radiation to cause the crosslinking in the molded product. Thus, the compression set characteristics can be further improved. As the ionizing radiation, an electron beam or γ-ray can be preferably used.

The sealing material can be a packing, a gasket or the like. The shape of the sealing material is appropriately selected depending on the intended use thereof, and a typical example thereof is an O-ring having an O-shaped cross section. The sealing material according to the present invention exhibits good ozone resistance, so that, in particular, it can be used as a sealing material for maintaining a degree of vacuum in a device using ozone under a high-temperature environment, such as a device used in a film forming process in producing a semiconductor device or a flat panel display.

EXAMPLES

Hereinafter, the present invention will be described in more detail with reference to Examples; however, the present invention is not intended to be limited thereto. The unit of the blending amount shown in the following table is parts by mass.

Example 1, Comparative Example 1

An elastomer composition was prepared and then a sealing material was produced in accordance with the following procedure. First, according to the blending compositions shown in Table 1, predetermined amounts of blending agents were kneaded with an open roll. Next, the resultant elastomer composition was press-molded under a condition of 165° C. for 20 minutes, and then subjected to secondary crosslinking by heat under a condition of 230° C. for 16 hours to obtain a sealing material.

TABLE 1

| | | Example 1 | Comparative Example 1 |
|---|---|---|---|
| Elastomer | First fluoroelastomer | 50 | — |
| | Second fluoroelastomer | 50 | 100 |
| | Filler | 20 | 20 |
| | Co-crosslinking agent | 3 | 3 |
| | Crosslinking agent | 1 | 1 |
| Compression set ratio (%) (200° C. × 72 h) | | 21 | 15 |

TABLE 1-continued

| | | | Example 1 | Comparative Example 1 |
|---|---|---|---|---|
| Ozone test | | Weight loss rate (%) | 3 | 3 |
| | Normal state physical properties | Before test | | |
| | | Hardness (type A) | 75 | 76 |
| | | Tensile strength (MPa) | 11.4 | 12.1 |
| | | Elongation at break (%) | 162 | 134 |
| | | 100% modulus (MPa) | 5.6 | 9.7 |
| | | Tensile product | 1847 | 1621 |
| | | After test | | |
| | | Hardness (type A) | 69 | 71 |
| | | Tensile strength (MPa) | 10.8 | 14 |
| | | Elongation at break (%) | 180 | 159 |
| | | 100% modulus (MPa) | 5.3 | 7.5 |
| | | Tensile product | 1944 | 2226 |
| | Change rate | Hardness (type A) | −7 | −5 |
| | | Tensile strength (%) | −5 | 16 |
| | | Elongation at break (%) | 11 | 19 |
| | | 100% modulus (%) | −5 | −23 |
| | | Tensile product ratio | 0.95 | 0.73 |

Details of components in Table 1 are as follows.

[1] First fluoroelastomer: perfluoroelastomer (TECNOFLON PFR LT, manufactured by Solvay) which is a tetrafluoroethylene-perfluoro (alkoxyvinyl ether)-halogen atom-containing monomer copolymer

[2] Second fluoroelastomer: perfluoroelastomer (TECNOFLON PFR-94, manufactured by Solvay) which is a tetrafluoroethylene-perfluoro (alkyl vinyl ether)-halogen atom-containing monomer copolymer

[3] Filler: carbon black (Thermax N990 ULTRA-PURE, manufactured by Cancarb Limited)

[4] Co-crosslinking agent: triallyl isocyanurate (TAIC, manufactured by Nihon Kasei Co., Ltd.)

[5] Crosslinking agent: 2,5-dimethyl-2,5-di-t-butyl-peroxyhexane (PERHEXA 25B manufactured by NOF CORPORATION).

(Evaluation of Sealing Materials)

An ozone exposure test was conducted, in which the resultant crosslinked molded product (sealing material) was placed under an environment of an ozone concentration of 200 g/m$^3$ and a temperature of 160° C. for 72 hours, and the following items were measured and evaluated.

[1] Weight Loss Rate (%)

The weight of the sealing material before and after the test was measured, and a weight loss rate was calculated according to the following formula:

weight loss rate (%)={(weight before test−weight after test)/(weight before test)}×100.

[2] Change Rate of Normal State Physical Properties

Normal state physical properties before and after the ozone exposure test were measured to determine a rate of change. The normal state physical properties were determined as follows. From a sheet-shaped molded product produced to a thickness of 2 mm according to JIS K6250: 2006, a dumbbell-shaped No. 3 test piece was punched out according to JIS K6251: 2010. The test piece was pulled at 500 mm/min, and the tensile strength, elongation at break, and 100% modulus were measured using a Schopper-type tensile tester. The rate of change was determined as change rate (%)={(value before test−value after test)/(value before test)}×100.

The hardness of the sheet-shaped molded product before and after the ozone exposure test was measured in accordance with JIS K6253-3: 2012 with a type-A durometer hardness tester. The rate of change was determined as change rate=(value before test−value after test).

[3] Tensile Product Ratio

The tensile products before and after the ozone exposure test were determined as {tensile strength (MPa)×elongation at break (%)}. The tensile product ratio can be determined by the following formula:

tensile product ratio=(tensile product before test)/(tensile product after test).

perature ozone environment, and the ozone resistance under a high-temperature environment was excellent.

Examples 2 to 8, Comparative Examples 2 to 3

According to the blending compositions shown in Table 2, an elastomer composition was prepared, and then a sealing material was produced. The preparation procedure was the same as that in Example 1 except that secondary crosslinking was performed under a condition of 230° C. for 4 hours.

TABLE 2

|  |  |  | Example 2 | Example 3 | Example 4 | Example 5 | Example 6 | Example 7 | Example 8 | Comparative Example 2 | Comparative Example 3 |
|---|---|---|---|---|---|---|---|---|---|---|---|
| Elastomer |  | First fluoroelastomer | 10 | 30 | 40 | 50 | 60 | 70 | 90 | 100 | — |
|  |  | Second fluoroelastomer | 90 | 70 | 60 | 50 | 40 | 30 | 10 | — | 100 |
|  |  | Filler | 20 | 20 | 20 | 20 | 20 | 20 | 20 | 20 | 20 |
|  | Co-crosslinking agent |  | 3 | 3 | 3 | 3 | 3 | 3 | 3 | 3 | 3 |
|  | Crosslinking agent |  | 1 | 1 | 1 | 1 | 1 | 1 | 1 | 1 | 1 |
| Normal state physical properties | Before Test | Hardness (type A) | 75 | 74 | 73 | 73 | 74 | 72 | 69 | 69 | 75 |
|  |  | Tensile strength (MPa) | 12 | 11.6 | 11.6 | 10.5 | 9.7 | 8.9 | 8.7 | 7.2 | 13.3 |
|  |  | Elongation at break (%) | 169 | 166 | 177 | 175 | 182 | 191 | 255 | 229 | 155 |
|  |  | 100% modulus (MPa) | 6.2 | 6.1 | 6 | 5 | 4.7 | 4.1 | 3.6 | 3.1 | 7.7 |
|  |  | Tensile product | 2028 | 1921 | 2053 | 1838 | 1766 | 1700 | 2216 | 1651 | 2062 |
|  | After Test | Hardness (type A) | 74 | 74 | 73 | 71 | 74 | 71 | 69 | 66 | 74 |
|  |  | Tensile strength (MPa) | 13.6 | 13 | 12.8 | 12.1 | 11.8 | 9.5 | 9.2 | 8.8 | 16.4 |
|  |  | Elongation at break (%) | 165 | 162 | 175 | 167 | 173 | 180 | 231 | 269 | 159 |
|  |  | 100% modulus (MPa) | 7.7 | 7.4 | 6.1 | 5.6 | 5.4 | 4.6 | 3.6 | 3 | 8.2 |
|  |  | Tensile product | 2244 | 2103 | 2240 | 2018 | 2041 | 1710 | 2121 | 2365 | 2611 |
|  | Change Rate | Hardness (type A) | −1 | 0 | 0 | −2 | 0 | −1 | −1 | −3 | −1 |
|  |  | Tensile strength | 13% | 12% | 10% | 15% | 22% | 7% | 6% | 22% | 23% |
|  |  | Elongation at break | −2% | −2% | −1% | −5% | −5% | −6% | −10% | 17% | 3% |
|  |  | 100% modulus | 24% | 21% | 2% | 12% | 15% | 12% | 0% | −3% | 6% |
|  | Tensile product ratio |  | 0.90 | 0.91 | 0.92 | 0.91 | 0.87 | 0.99 | 1.04 | 0.70 | 0.79 |

It can be evaluated that a change in the tensile product is smaller and the ozone resistance under a high-temperature environment is more excellent as the tensile product ratio is closer to 1.

[4] Compression Set of Sealing Material

The compression set of the sealing material was determined in accordance with JIS K6262: 2013. An 0 ring having a wire diameter φ of 3.53 was held at 200° C. for 72 hours at a compression ratio of 25%. Compression of a test piece was released, and after the test piece was allowed to cool at a standard temperature of a test chamber for 30 minutes, a thickness of the test piece was measured. The compression set (CS) ratio was calculated based on the following formula:

compression set ratio (%)={(h0−h1)/(h0−h2)}×100.

h0 is the thickness (mm) of the test piece before the test, h1 is the thickness (mm) of the test piece after cooling for 30 minutes, and h2 is a thickness (height) (mm) of a spacer.

The evaluation results are shown in Table 1. In the sealing material of Example 1, an absolute value of the rate of change in the normal state physical properties before and after the ozone test was small, and the tensile product ratio was close to 1, as compared with the sealing material of Comparative Example 1. It was found that in a crosslinked product of an elastomer composition containing the first fluoroelastomer, which was a copolymer of tetrafluoroethylene and perfluoro (alkoxyvinyl ether), and the second fluoroelastomer, the physical properties are hardly changed when the crosslinked product was exposed to a high-tem- Details of components in Table 2 are the same as those in Table 1

An ozone exposure test was conducted, in which the resultant crosslinked molded product (sealing material) was placed under an environment of an ozone concentration of 200 g/m$^3$ and a temperature of 190° C. for 24 hours, and [2] the change rate of the normal state physical properties and [3] the tensile product ratio were measured. The evaluation results are shown in Table 2.

The tensile product ratios of crosslinked products of Examples 2 to 8 were closer to 1 than the tensile product ratios of crosslinked products of Comparative Examples 2 and 3. It was found that the crosslinked product of the elastomer composition containing the first fluoroelastomer and the second fluoroelastomer in a mass ratio ranging from 10:90 to 90:10 was more excellent in the ozone resistance under a high-temperature environment than the crosslinked product of the elastomer composition containing only the first fluoroelastomer or only the second fluoroelastomer as a polymer.

Example 9, Comparative Example 4

According to the blending compositions shown in Table 3, an elastomer composition was prepared, and then a sealing material was produced. The preparation procedure was the same as that in Example 2.

TABLE 3

|  |  | Example 9 | Comparative Example 4 |
|---|---|---|---|
| Elastomer | First fluoroelastomer | 50 | — |
|  | Second fluoroelastomer | 50 | 100 |
|  | Filler | 20 | 20 |
|  | Co-crosslinking agent | 3 | 3 |
|  | Crosslinking agent | 1 | 1 |
| Normal state physical properties | Before test Hardness (type A) | 68 | 72 |
|  | Tensile strength (MPa) | 7.9 | 8.1 |
|  | Elongation at break (%) | 200 | 279 |
|  | 100% modulus (MPa) | 4.1 | 4.3 |
|  | Tensile product | 1580 | 2259 |
|  | After test Hardness (type A) | 67 | 74 |
|  | Tensile strength (MPa) | 10.8 | 14.3 |
|  | Elongation at break (%) | 185 | 248 |
|  | 100% modulus (MPa) | 5.1 | 7.2 |
|  | Tensile product | 1995 | 3552 |
|  | Change rate Hardness (type A) | −1 | 3 |
|  | Tensile strength | 37% | 77% |
|  | Elongation at break | −8% | −11% |
|  | 100% modulus | 24% | 67% |
|  | Tensile product ratio | 0.79 | 0.64 |

Details of components in Table 3 are the same as those in Table 1 except that the elastomer described in the following [2] is used as the second fluoroelastomer. [2] Second fluoroelastomer: perfluoroelastomer (Dyneon PFE 90Z, manufactured by 3M) which is a tetrafluoroethylene-perfluoro(alkyl vinyl ether)-halogen atom-containing monomer copolymer An ozone exposure test was conducted, in which the resultant crosslinked molded product (sealing material) was placed under an environment of an ozone concentration of 200 g/m³ and a temperature of 190° C. for 24 hours, and [2] the change rate of the normal state physical properties and [3] the tensile product ratio were measured. The evaluation results are shown in Table 3.

The tensile product ratio of a crosslinked product of Example 9 was closer to 1 than the tensile product ratio of a crosslinked product of Comparative Example 4. It was found that the crosslinked product of the elastomer composition containing the first fluoroelastomer and the second fluoroelastomer was more excellent in the ozone resistance under a high-temperature environment than the crosslinked product of the elastomer composition containing only the second fluoroelastomer as a polymer. Even when a perfluoroelastomer different from perfluoroelastomers of Examples 1 to 8 was used as the second fluoroelastomer, the ozone resistance under a high-temperature environment could be improved by blending the perfluoroelastomer together with the first fluoroelastomer.

Example 10, Comparative Example 5

According to the blending compositions shown in Table 4, an elastomer composition was prepared, and then a sealing material was produced. The preparation procedure was the same as that in Example 2.

TABLE 4

|  |  | Example 10 | Comparative Example 5 |
|---|---|---|---|
| Elastomer | PFR-LT | 50 | — |
|  | GA-15 | 50 | 100 |
|  | Filler | 20 | 20 |
|  | Co-crosslinking agent | 3 | 3 |
|  | Crosslinking agent | 1 | 1 |

TABLE 4-continued

|  |  | Example 10 | Comparative Example 5 |
|---|---|---|---|
| Normal state physical properties | Before test Hardness (type A) | 67 | 64 |
|  | Tensile strength (MPa) | 8.2 | 8.5 |
|  | Elongation at break (%) | 189 | 178 |
|  | 100% modulus (MPa) | 3.6 | 3.7 |
|  | Tensile product | 1546 | 1516 |
|  | After test Hardness (type A) | 67 | 59 |
|  | Tensile strength (MPa) | 9.5 | 9.8 |
|  | Elongation at break (%) | 187 | 210 |
|  | 100% modulus (MPa) | 4.6 | 3.1 |
|  | Tensile product | 1778 | 2060 |
|  | Change rate Hardness (type A) | −1 | −5 |
|  | Tensile strength | 16% | 15% |
|  | Elongation at break | −1% | 18% |
|  | 100% modulus | 28% | −16% |
|  | Tensile product ratio | 0.87 | 0.74 |

Details of components in Table 4 are shown below.
PFR-LT: "TECNOFLON PFR-LT", manufactured by Solvay
GA-15: "DAI-EL PERFLO GA-15", manufactured by DAIKIN INDUSTRIES, LTD.
The fillers, the co-crosslinking agents, and the crosslinking agents are the same as those described in Table 1.

An ozone exposure test was conducted, in which the resultant crosslinked molded product (sealing material) was placed under an environment of an ozone concentration of 200 g/m³ and a temperature of 190° C. for 24 hours, and [2] the change rate of the normal state physical properties and [3] the tensile product ratio were measured. The evaluation results are shown in Table 4.

The tensile product ratio of a crosslinked product of Example 10 was closer to 1 than the tensile product ratio of a crosslinked product of Comparative Example 5. It was found that the crosslinked product of the elastomer composition containing PFR-LT and GA-15 was more excellent in the ozone resistance under a high-temperature environment than the crosslinked product of the elastomer composition containing only GA-15 as a polymer.

Example 11, Comparative Example 6

According to the blending compositions shown in Table 5, an elastomer composition was prepared, and then a sealing material was produced. The preparation procedure was the same as that in Example 2.

TABLE 5

|  |  | Example 11 | Comparative Example 6 |
|---|---|---|---|
| Elastomer | First fluoroelastomer | 50 | — |
|  | Second fluoroelastomer | 50 | 100 |
|  | Filler | 20 | 20 |
|  | Co-crosslinking agent | 3 | 3 |
|  | Crosslinking agent | 1 | 1 |
| Normal state physical properties | Before test Hardness (type A) | 67 | 64 |
|  | Tensile strength (MPa) | 10.1 | 14 |
|  | Elongation at break (%) | 209 | 224 |
|  | 100% modulus (MPa) | 4.2 | 3.7 |
|  | Tensile product | 2110 | 3139 |
|  | After test Hardness (type A) | 68 | 63 |
|  | Tensile strength (MPa) | 9.2 | 20.2 |
|  | Elongation at break (%) | 175 | 276 |
|  | 100% modulus (MPa) | 4.6 | 3.6 |
|  | Tensile product | 1605 | 5583 |
|  | Change rate Hardness (type A) | 1 | −1 |
|  | Tensile strength | −9% | 44% |

TABLE 5-continued

|  | Example 11 | Comparative Example 6 |
|---|---|---|
| Elongation at break | −16% | 23% |
| 100% modulus | 10% | −3% |
| Tensile product ratio | 1.31 | 0.56 |

Details of components in Table 5 are the same as those in Table 1 except that the elastomer described in the following [2] is used as the second fluoroelastomer. [2] Second fluoroelastomer: ternary fluororubber which is a vinylidene fluoride-hexafluoropropylene-tetrafluoroethylene copolymer (TECNOFLON P 459, manufactured by Solvay)

An ozone exposure test was conducted, in which the resultant crosslinked molded product (sealing material) was placed under an environment of an ozone concentration of 200 g/m$^3$ and a temperature of 190° C. for 24 hours, and [2] the change rate of the normal state physical properties and [3] the tensile product ratio were measured. The evaluation results are shown in Table 5.

The tensile product ratio of a crosslinked product of Example 11 was closer to 1 than the tensile product ratio of a crosslinked product of Comparative Example 6. It was found that the crosslinked product of the elastomer composition containing the first fluoroelastomer and the second fluoroelastomer was more excellent in the ozone resistance under a high-temperature environment than the crosslinked product of the elastomer composition containing only the second fluoroelastomer as a polymer. Even when fluororubber was used as the second fluoroelastomer, the ozone resistance under a high-temperature environment could be improved by blending the fluororubber together with the first fluoroelastomer.

The invention claimed is:

1. An elastomer composition consisting of:
   a first fluoroelastomer being a copolymer containing a constituent unit derived from tetrafluoroethylene, one or more constituent units derived from perfluoro (alkoxyvinyl ether), and a constituent derived from a crosslinking site monomer;
   a second fluoroelastomer different from the first fluoroelastomer, a peroxide crosslinking agent and a co-crosslinking agent, and a filler, or consisting of two or more of the first fluoroelastomers, the peroxide crosslinking agent and the co-crosslinking agent, and the filler,
   wherein the second fluoroelastomer is a perfluoroelastomer, and the second fluoroelastomer is a copolymer containing the constituent unit derived from tetrafluoroethylene, one or more constituent units derived from perfluoro (alkyl vinyl ether), and a constituent unit derived from a crosslinking site monomer,
   wherein the co-crosslinking agent is triallyl isocyanurate, and
   wherein the first fluoroelastomer and the second fluoroelastomer are contained in a mass ratio of 10:90 to 90:10.

2. A sealing material comprising a crosslinked product of the elastomer composition according to claim 1.

* * * * *